(12) United States Patent
Arakawa et al.

(10) Patent No.: US 10,527,641 B2
(45) Date of Patent: Jan. 7, 2020

(54) MOBILE DEVICE

(71) Applicant: KABUSHIKI KAISHA TOKAI RIKA DENKI SEISAKUSHO, Aichi (JP)

(72) Inventors: Masahiro Arakawa, Aichi (JP); Daisuke Kawamura, Aichi (JP); Hidenobu Hanaki, Aichi (JP); Kazunori Sobue, Aichi (JP); Tetsuya Kawamura, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/080,769

(22) PCT Filed: Feb. 21, 2017

(86) PCT No.: PCT/JP2017/006366
§ 371 (c)(1),
(2) Date: Aug. 29, 2018

(87) PCT Pub. No.: WO2017/150274
PCT Pub. Date: Sep. 8, 2017

(65) Prior Publication Data
US 2019/0178907 A1  Jun. 13, 2019

(30) Foreign Application Priority Data

Mar. 1, 2016 (JP) ................. 2016-038872

(51) Int. Cl.
*G08B 21/00* (2006.01)
*G01P 15/08* (2006.01)
(Continued)

(52) U.S. Cl.
CPC .............. *G01P 15/08* (2013.01); *B60R 25/24* (2013.01); *G01P 15/0891* (2013.01);
(Continued)

(58) Field of Classification Search
None
See application file for complete search history.

(56) References Cited

U.S. PATENT DOCUMENTS 8,878,670 B2   11/2014   Rosen et al.
9,454,861 B2    9/2016   Mimura
(Continued)

FOREIGN PATENT DOCUMENTS

EP      2699044 A2      2/2014
JP   2010-275701 A     12/2010
(Continued)

OTHER PUBLICATIONS

International Search Report issued in International Bureau of WIPO Patent Application No. PCT/JP2017/006366, dated Apr. 25, 2017.
(Continued)

*Primary Examiner* — Adolf Dsouza
(74) *Attorney, Agent, or Firm* — Greenblum & Bernstein, P.L.C.

(57) ABSTRACT

A mobile device possessed by a user is equipped with: a motion sensor which is capable of detecting the motion of the mobile device; a receiver which is capable of receiving a polling signal transmitted from equipment; and a control unit which is configured so as to set, in response to whether or not the polling signal has been received by the receiver, the sampling speed with which the motion sensor detects the motion of the mobile device.

5 Claims, 2 Drawing Sheets

(51) Int. Cl.
  *H04W 52/02*    (2009.01)
  *B60R 25/24*    (2013.01)
  *G07C 9/00*     (2006.01)
  *E05B 77/54*    (2014.01)
  *H04M 1/725*    (2006.01)

(52) U.S. Cl.
  CPC .... *G07C 9/00309* (2013.01); *H04W 52/0229* (2013.01); *H04W 52/0254* (2013.01); *E05B 77/54* (2013.01); *G07C 2009/0038* (2013.01); *G07C 2009/00507* (2013.01); *H04M 1/7253* (2013.01); *H04M 2250/12* (2013.01)

(56) References Cited

U.S. PATENT DOCUMENTS

2013/0196688 A1* 8/2013 Lu .......................... G01S 19/19
                                                  455/456.1
2014/0313011 A1  10/2014 Mimura
2014/0375423 A1  12/2014 Lagabe
2015/0342494 A1  12/2015 Lou et al.
2016/0101745 A1   4/2016 Siswick et al.

FOREIGN PATENT DOCUMENTS

| | | |
|---|---|---|
| JP | 2011-000903 A | 1/2011 |
| JP | 2013-72172 A  | 4/2013 |
| JP | 2014-091434 A | 5/2014 |
| JP | 2014-190046 A | 10/2014 |
| JP | 2014-216718 A | 11/2014 |
| JP | 2015-510178 A | 4/2015 |
| JP | 2015/177848 A | 10/2015 |
| WO | 2014/191537 A1 | 12/2014 |

OTHER PUBLICATIONS

International Preliminary Repor on Patentability issued in International Bureau of WIPO Patent Application No. PCT/JP2017/006366, dated Sep. 4, 2018.

* cited by examiner

MOBILE DEVICE

TECHNICAL FIELD

The present invention relates to a mobile device carried by a user.

BACKGROUND ART

A vehicle equipped with the so-called Smart Key System (registered trademark) establishes bi-directional communication with a mobile device carried by a user to perform key authentication and unlocks a door under the condition that key authentication has been accomplished. For example, the vehicle transmits LF signals from a transmitter to form an LF area around the door in order to monitor the approach of the mobile device. When the user carrying the mobile device enters the LF area, the mobile device sends an RF signal in response to an LF signal. The vehicle analyzes the RF signal and permits unlocking of the door when key authentication is accomplished. In this case, the door actually is unlocked when the user touches the door handle.

A technique that incorporates an acceleration sensor in the mobile device has been developed to prevent unauthorized actions performed with a relay. When the acceleration sensor detects vibration of the mobile device, the reception of the LF signals is permitted. Further, when the acceleration sensor does not detect vibration of the mobile device, the reception of the LF signals is prohibited (for example, refer to patent documents 1 to 3).

A further developed technique incorporates an acceleration sensor in the mobile device to detect motions of the user and operate the vehicle when a predetermined motion has been detected or to use the motion of the user as an authentication condition (for example, refer to patent documents 4 and 5).

PRIOR ART LITERATURE

Patent Literature

Patent Document 1: Japanese National Phase Laid-Open Patent Publication No. 2015-510178
Patent Document 2: Japanese Laid-Open Patent Publication No. 2014-190046
Patent Document 3: Japanese Laid-Open Patent Publication No. 2014-091434
Patent Document 4: Japanese Laid-Open Patent Publication No. 2011-000903
Patent Document 5: Japanese Laid-Open Patent Publication No. 2010-275701

SUMMARY OF THE INVENTION

When the same acceleration sensor is used for different applications, the sampling speed may be set in accordance with applications that require high-speed sampling so that the acceleration sensor is also applicable to low-speed sampling applications. However, constant high-speed sampling would increase current consumption and shorten the battery life of the mobile device.

Accordingly, it is an object of the present invention to provide a mobile device that allows for reduction of the current consumption.

The mobile device, which is carried by a user, in accordance with one aspect of the present invention includes a motion sensor, a receiver, and a controller. The motion sensor is configured to detect movement of the mobile device. The receiver is configured to receive a polling signal, which is transmitted from an apparatus. The controller is configured to set a sampling speed for the motion sensor to detect movement of the mobile device based on whether or not the receiver has received the polling signal.

This configuration allows the sampling speed of the motion sensor to be set differently for when the mobile device is near the apparatus and for when the mobile device is not near the apparatus. For example, when the mobile device is near the apparatus, the sampling speed is set to a high speed. When the mobile device is not near the apparatus, the sampling speed is set to a low speed. In this way, in comparison with a structure that requires constant high speed sampling, current consumption is reduced.

The controller may further be configured to set the sampling speed of the motion sensor to a first sampling speed when the receiver does not receive the polling signal, and to set the sampling speed of the motion sensor to a second sampling speed, which is higher than the first sampling speed, when the receiver receives the polling signal.

The motion sensor may be configured to detect vibration of the mobile device at the first sampling speed.

This configuration allows the enabling and disabling of a polling signal receiving function to be set differently for when vibration of the mobile device is detected and when vibration of the mobile device is not detected. For example, the polling signal receiving function is enabled when the motion sensor detects vibration of the mobile device, and the polling signal receiving function is disabled when the motion sensor does not detect vibration of the mobile device. In this way, in comparison with a structure that constantly enables the polling signal receiving function, current consumption is reduced.

The motion sensor may be configured to detect a predetermined movement of the mobile device at the second sampling speed.

This configuration allows for accurate detection of movement of the mobile device when the mobile device is near the apparatus. Accordingly, when motion of the user is used as an authentication condition, the effect for preventing unauthorized actions performed with a relay can be improved.

The controller may further be configured to shift to a standby mode that disables the polling signal receiving function of the receiver when the receiver does not receive the polling signal and the motion sensor does not detect vibration of the mobile device.

This configuration prevents relay attacks (unauthorized actions performed with relay) against the mobile device, which is kept still at a location not near the apparatus.

The controller may further be configured to shift to a signal receiving mode that enables the polling signal receiving function of the receiver when the motion sensor detects vibration of the mobile device in the standby mode.

With this configuration, when the mobile device, which was initially kept still at a location not near the apparatus, is carried, the polling signal receiving function is enabled and a polling signal is actually received when the mobile device is near the apparatus. This allows the sampling speed of the motion sensor to be set differently based on whether or not a polling signal has been received.

In accordance with the present embodiment, current consumption is reduced.

Other aspects and advantages of the present invention will become apparent from the following description, taken in conjunction with the accompanying drawings, illustrating by way of example the principles of the invention.

EMBODIMENTS OF THE INVENTION

A mobile device in accordance with one embodiment will now be described.

Figure 1:
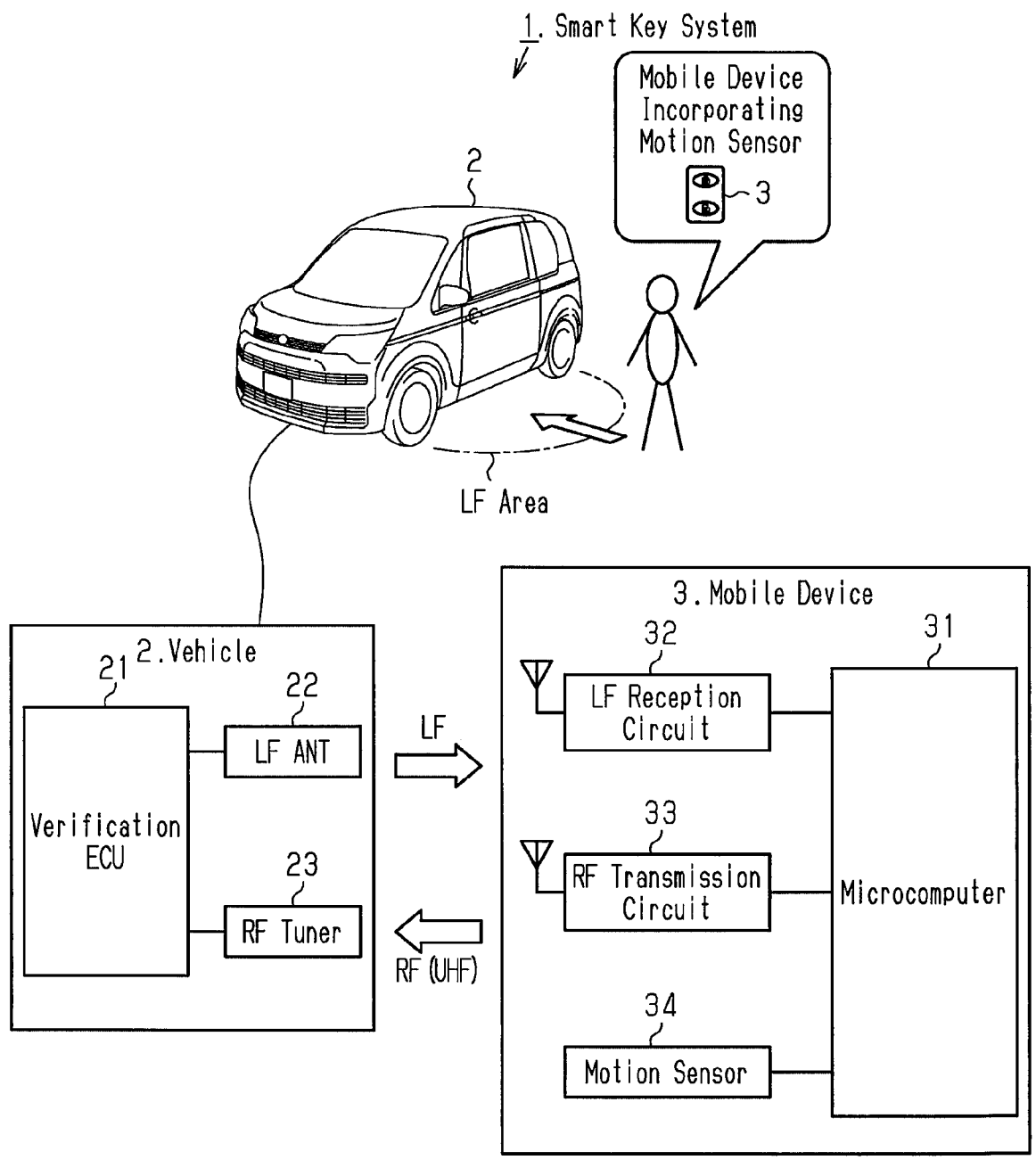
FIG. 1 is a block diagram showing the configuration of a Smart Key System.

As shown in FIG. 1, a Smart Key System (registered trademark) 1 establishes bi-directional communication between a vehicle 2 and a mobile device 3 to perform key verification and unlock a door under the condition that the key authentication has been accomplished.

The vehicle 2 includes a verification ECU 21, an LF antenna 22, and an RF tuner 23. The verification ECU 21 controls security of the vehicle 2. The LF antenna 22 is configured to transmit LF signals (for example, radio wave in LF band), and the RF tuner 23 is configured to receive RF signals (for example, radio wave in UHF band). The vehicle 2 corresponds to an apparatus.

The verification ECU 21 transmits polling signals from the LF antenna 22 and forms an LF area around the door in order to monitor the mobile device 3 approaching the vehicle 2. When a user carrying the mobile device 3 enters the LF area, the mobile device 3 receives a polling signal and transmits a response signal that includes a key code unique to the mobile device 3.

After receiving the response signal via the RF tuner 23, the verification ECU 21 analyzes the response signal. The key code of the mobile device 3 is registered to the verification ECU 21. The verification ECU 21 analyzes the response signal to verify the key code with the registered key code. When the key codes match and the key authentication has been accomplished, the verification ECU 21 permits unlocking of the door. In this case, the door actually unlocks when the user touches the door handle.

The mobile device 3 includes a microcomputer 31, an LF reception circuit 32, and an RF transmission circuit 33. The microcomputer 31 centrally controls the mobile device 3. The LF reception circuit 32 is configured to receive the LF signals, and the RF transmission circuit 33 is configured to transmit the RF signals. The LF reception circuit 32 corresponds to a receiver. After receiving a polling signal via the LF reception circuit 32, the microcomputer 31 transmits a response signal that includes a key code unique to the mobile device 3 from the RF transmission circuit 33.

The mobile device 3 of the present embodiment incorporates a motion sensor 34 configured to detect movement of the mobile device 3. The microcomputer 31 sets, based on whether or not the LF reception circuit 32 has detected a polling signal, a sampling speed of the motion sensor 34 for detecting movement of the mobile device 3. The microcomputer 31 corresponds to a controller. In the present embodiment, the microcomputer 31 sets a sampling speed of the motion sensor 34 to a first sampling speed when the LF reception circuit 32 does not receive a polling signal. Further, the microcomputer 31 sets the sampling speed to a second sampling speed, which is higher than the first sampling speed, when the LF reception circuit 32 receives a polling signal. For example, the motion sensor 34 is configured to detect whether or not the mobile device 3 is vibrating at the slow first sampling speed. Further, the motion sensor 34 is configured to detect predetermined movements (for example, movements combined with bending-stretching motion and stopping motion of user) of the mobile device 3 at the high second sampling speed. Thus, the motion sensor 34 detects whether or not the mobile device 3 has only been moved at the first sampling speed to reduce power consumption. Further, the motion sensor 34 detects whether or not the mobile device 3 has undergone the predetermined movement at the second sampling speed to accurately detect the predetermined movement of the mobile device 3.

When the microcomputer 31 detects the predetermined movement of the mobile device 3 with the motion sensor 34, the microcomputer 31 transmits an operation completion signal from the RF transmission circuit 33. The operation completion signal includes an operation code, which instructs a sliding door to open, and the key code of the mobile device 3. After the RF tuner 23 receives the operation completion signal, the verification ECU 21 of the vehicle 2 analyzes the operation completion signal. When key authentication is accomplished, the verification ECU 21 opens the sliding door in accordance with the instruction of the operation code.

The operation of the mobile device 3 will now be described.

Figure 2:
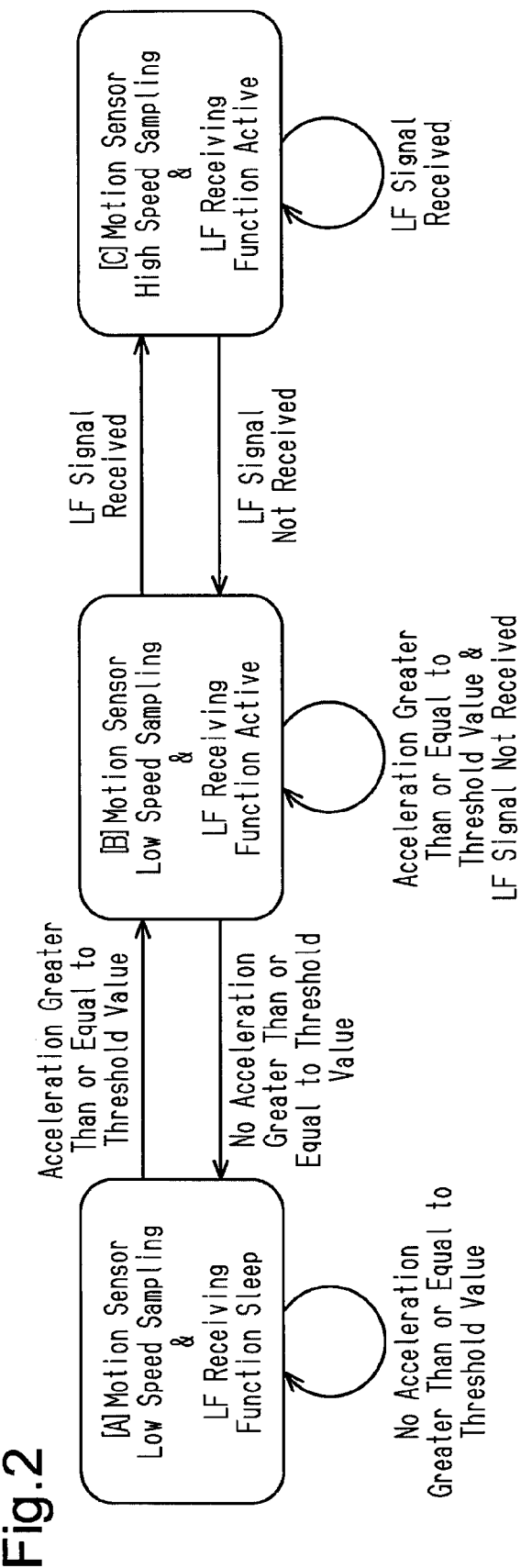
FIG. 2 is a state transition diagram of a mobile device.

As shown in FIG. 2, the state of the microcomputer 31 is shifted between states (A) to (C). In state (A), the motion sensor 34 is set to the first sampling speed and the poll signal receiving function of the LF reception circuit 32 is disabled (sleep). In state (B), the motion sensor 34 is set to the first sampling speed and the poll signal receiving function of the LF reception circuit 32 is enabled (active). In state (C), the motion sensor 34 is set to the second sampling speed and the poll signal receiving function of the LF reception circuit 32 is enabled (active). State (A) is a standby mode that disables the LF signal receiving function. State (B) and state (C) are signal receiving modes enabling the LF signal receiving function. Further, state (B) corresponds to a first signal receiving mode that sets the motion sensor 34 to the first sampling speed. State (C) corresponds to a second signal receiving mode that sets the motion sensor 34 to the second sampling speed. That is, the microcomputer 31 is operated in actuation modes including the standby mode, which sets the sampling speed of the motion sensor 34 to the first sampling speed and disables the polling signal receiving function of the LF reception circuit 32, and the signal receiving mode, which enables the polling signal receiving function of the LF reception circuit 32. Further, the signal receiving mode includes the first signal receiving mode, which sets the sampling speed of the motion sensor 34 to the first sampling speed, and the second signal receiving mode, which sets the sampling speed of the motion sensor 34 to the second sampling speed.

The microcomputer 31 switches the actuation mode between the standby mode and the first signal receiving mode based on whether or not the motion sensor 34 has detected movement of the mobile device 3 at the first sampling speed. Further, the microcomputer 31 switches the actuation mode between the first signal receiving mode and the second signal receiving mode based on whether or not the LF reception circuit 32 has received a polling signal.

The operation of the mobile device 3 will now be described in detail.

In state (A), the microcomputer 31 maintains state (A) as long as the motion sensor 34 does not detect acceleration that is greater than or equal to a threshold value. More specifically, when the motion sensor 34 does not detect acceleration that is greater than or equal to the threshold value, the microcomputer 31 acknowledges that vibration of the mobile device 3 has not been detected and that the mobile device 3 is still. Further, in state (A), when the motion sensor 34 detects acceleration that is greater than or equal to the threshold value, the microcomputer 31 shifts the state from state (A) to state (B). That is, when the motion sensor 34 detects acceleration that is greater than or equal to the threshold value, the microcomputer 31 acknowledges that vibration of the mobile device 3 has been detected and that the user, who is carrying the mobile device 3, is walking. In state (A), state transition is not determined by whether or not an LF signal has been received.

In state (B), the microcomputer 31 maintains state (B) as long as the motion sensor 34 detects acceleration that is greater than or equal to the threshold value and the LF reception circuit 32 does not receive a polling signal. That is, when the motion sensor 34 detects acceleration that is greater than or equal to the threshold value and the LF reception circuit 32 does not receive a polling signal, the microcomputer 31 acknowledges that the user, who is carrying the mobile device 3, is walking outside the LF area. Further, in state (B), when the motion sensor 34 no longer detects acceleration that is greater than or equal to the threshold value, the microcomputer 31 shifts the state from state (B) to state (A). That is, in state (B), when the motion sensor 34 no longer detects acceleration that is greater than or equal to the threshold value, the microcomputer 31 acknowledges that the mobile device 3, which had been carried, has become still again or that the user, who is carrying the mobile device 3, has stopped walking. Additionally, in state (B), when the LF reception circuit 32 receives a polling signal, the microcomputer 31 shifts the state from state (B) to state (C). When the LF reception circuit 32 receives a polling signal, the microcomputer 31 detects that the user, who is carrying the mobile device 3, has entered the LF area.

In state (C), the microcomputer 31 maintains state (C) as long as the LF reception circuit 32 receives an LF signal. In state (C), when the LF reception circuit 32 receives an LF signal such as a polling signal, the microcomputer 31 determines that the user, who is carrying the mobile device 3, is remaining in the LF area. In state (C), state transition is not affected by the level of acceleration detected by the motion sensor 34. In state (C), when the LF reception circuit 32 no longer receives an LF signal, the microcomputer 31 shifts the state from state (C) to state (B). In state (C), when the LF reception circuit 32 no longer receives an LF signal, the microcomputer 31 detects that the user, who is carrying the mobile device 3, has moved out of the LF area.

Accordingly, when the mobile device 3 is located outside the LF area, the microcomputer 31 sets the sampling speed of the motion sensor 34 to the low first sampling speed (state (A) and state (B)). Further, when the mobile device 3 is located in the LF area, the microcomputer 31 sets the sampling speed of the motion sensor 34 to the high second sampling speed (state (C)). In this way, when the user, who is carrying the mobile device 3, performs the combination of a bending-stretching motion and a stopping motion in the LF area, the microcomputer 31 detects the predetermined movement with the motion sensor 34 and transmits the operation completion signal from the RF transmission circuit 33. As a result, the vehicle 2 receives the operation completion signal and opens the sliding door in response to the operation completion signal. For example, the microcomputer 31 receives a motion sensor signal, which indicates movement of the mobile device, from the motion sensor 34. In state (A) and state (B), the microcomputer 31 determines, based on the motion sensor signal, whether or not the mobile device 3 has only been moved. Then, the microcomputer 31 switches the actuation mode between the standby mode and the first signal receiving mode in accordance with the determination result. Further, in state (C), the microcomputer 31 determines, based on the motion sensor signal, whether or not the predetermined movement of the mobile device has been performed. Then, the microcomputer 31 transmits the operation completion signal from the RF transmission circuit 33 in accordance with the determination result.

As described above, the present embodiment obtains the following advantages.

(1) The sampling speed of the motion sensor 34 is set differently for when the mobile device 3 is inside the LF area and for when the mobile device 3 is outside the LF area. In the present embodiment, when the mobile device 3 is inside the LF area, the sampling speed is set to a high speed. When the mobile device 3 is outside the LF area, the sampling speed is set to a low speed. Accordingly, in comparison with a structure that requires constant high speed sampling, current consumption is reduced.

(2) The mobile device 3 is usually kept still when located outside the LF area such as near the door of a house and carried when needed such as when driving the vehicle 2. That is, when in use, the mobile device 3 is located outside the LF area for longer periods than inside the LF area. Thus, as described in advantage (1), by setting the sampling speed to a low speed when the mobile device 3 is outside the LF area, the mobile device 3 will consume less power.

(3) When the mobile device 3 is outside the LF area, the enabling and disabling of the polling signal receiving function is set differently for when vibration of the mobile device 3 is detected and when vibration of the mobile device 3 is not detected. In the present embodiment, when the motion sensor 34 detects vibration of the mobile device 3, the polling signal receiving function is enabled. Further, when the motion sensor 34 does not detect vibration of the mobile device 3, the polling signal receiving function is disabled. In this way, in comparison with a structure that constantly enables the polling signal receiving function, current consumption is reduced.

(4) As described in advantage (2), when in use, the mobile device 3 is most of the time kept near the door of a house or the like. Under this situation, bi-directional communication does not necessarily have to be established with the vehicle 2. By disabling the LF receiving function over such long periods, as described in advantage (3), the mobile device 3 will consume less power.

(5) In addition to advantage (4), relay attacks (unauthorized actions performed with relay) are prevented against the mobile device 3 when kept still outside the LF area.

(6) When the mobile device 3 is in the LF area, movement of the mobile device 3 is accurately detected. Thus, when the motion of the user is used as an authentication condition, the effect for preventing unauthorized actions performed with a relay can be improved.

(7) When the mobile device 3, which was initially kept still outside the LF area, is carried, the polling signal receiving function is enabled and a polling signal is actually received in the LF area. This allows the sampling speed of the motion sensor 34 to be set differently based on whether or not a polling signal has been received.

The above embodiment may be modified as follows.

The motion sensor 34, in addition to an acceleration sensor, may be an angular velocity sensor, a vibration sensor, or the like.

It is desirable that the low speed sampling allows vibration of the mobile device 3 to be detected. A lower sampling speed will consume less current.

It is desirable that the high speed sampling allows the predetermined movement of the mobile device 3 to be detected. A higher sampling speed will detect movement of the mobile device 3 more accurately.

The sampling speed may be set to three levels or more in accordance with a target accuracy for detecting movement of the mobile device 3, which is a detection subject.

The movement of the mobile device 3, which is the detection subject, may be changed in any manner.

The apparatus is not limited to the vehicle 2. The motion sensor 34 may set the sampling speed for detecting movement of the mobile device 3 based on whether or not a polling signal has been received from a door or the like of a building.

The LF signals of low frequency waves are not limited to radio waves in the LF band.

The RF signals of high frequency wave are not limited to radio waves in the UHF band.

The microcomputer 31 may include one or more processors, which function as a controller, and a non-transitory machine-readable memory medium, which stores instructions executed by the one or more processors.

It should be apparent to those skilled in the art that the present invention may be embodied in many other specific forms without departing from the spirit or scope of the invention. For example, some of the components may be omitted from all components disclosed in the embodiment (or of one or more forms of the embodiment). Further, components in the embodiment may be appropriately combined. Therefore, the present examples and embodiment are to be considered as illustrative and not restrictive, and the invention is not to be limited to the details given herein, but may be modified within the scope and equivalence of the appended claims.

DESCRIPTION OF REFERENCE CHARACTERS

1) Smart Key System;
2) vehicle (apparatus);
3) mobile device;
21) verification ECU;
22) LF antenna;
23) RF tuner;
31) microcomputer (controller);
32) LF reception circuit (receiver);
33) RF transmission circuit;
34) motion sensor

The invention claimed is:

1. A mobile device carried by a user, the mobile device comprising:
a motion sensor that is configured to detect movement of the mobile device at a sampling speed;
a receiver that is configured to receive a polling signal transmitted from an apparatus; and
a controller that is configured to set the sampling speed for the motion sensor based on whether or not the receiver has received the polling signal,
wherein the controller is further configured to set
the sampling speed of the motion sensor to a first sampling speed when the receiver does not receive the polling signal, and
the sampling speed of the motion sensor to a second sampling speed, which is higher than the first sampling speed, when the receiver receives the polling signal, and
wherein:
an actuation mode of the controller includes
a standby mode that sets the sampling speed of the motion sensor to the first sampling speed and disables a polling signal receiving function of the receiver, and
a signal receiving mode that enables the polling signal receiving function of the receiver;
the signal receiving mode includes
a first signal receiving mode that sets the sampling speed of the motion sensor to the first sampling speed, and
a second signal receiving mode that sets the sampling speed of the motion sensor to the second sampling speed; and
the controller is further configured to
switch the actuation mode between the standby mode and the first signal receiving mode based on whether or not the motion sensor has detected movement of the mobile device at the first sampling speed, and
switch the actuation mode between the first signal receiving mode and the second signal receiving mode based on whether or not the receiver has received the polling signal.

2. The mobile device according to claim 1, wherein the motion sensor is configured to detect vibration of the mobile device at the first sampling speed.

3. The mobile device according to claim 1, wherein the motion sensor is configured to detect a predetermined movement of the mobile device at the second sampling speed.

4. A mobile device carried by a user, the mobile device comprising:
a motion sensor that is configured to detect movement of the mobile device at a sampling speed;
a receiver that is configured to receive a polling signal transmitted from an apparatus; and
a controller that is configured to set the sampling speed for the motion sensor based on whether or not the receiver has received the polling signal,
wherein the controller is further configured to shift to a standby mode disabling a polling signal receiving function of the receiver when the receiver does not receive the polling signal and the motion sensor does not detect vibration of the mobile device.

5. The mobile device according to claim 4, wherein the controller is further configured to shift to a signal receiving mode enabling the polling signal receiving function of the receiver when the motion sensor detects vibration of the mobile device in the standby mode.

* * * * *